United States Patent [19]
Cordell et al.

[11] Patent Number: 5,893,915
[45] Date of Patent: Apr. 13, 1999

[54] LOCAL FONT FACE SELECTION FOR REMOTE ELECTRONIC DOCUMENT BROWSING

[75] Inventors: John Palmer Cordell, Bellevue; Thomas R. Reardon, Seattle, both of Wash.

[73] Assignee: Microsoft Corporation, Redmond, Wash.

[21] Appl. No.: 08/634,462

[22] Filed: Apr. 18, 1996

[51] Int. Cl.$^6$ .................................................. G06F 17/00
[52] U.S. Cl. ........................ 707/513; 707/514; 707/542
[58] Field of Search ................................ 395/793, 110, 395/144, 145, 114, 805, 603, 170; 340/146; 380/4, 49, 23; 382/176; 364/436, 523

[56] References Cited

U.S. PATENT DOCUMENTS

| | | | |
|---|---|---|---|
| 4,594,674 | 6/1986 | Boulia et al. | 345/471 |
| 5,210,824 | 5/1993 | Putz et al. | 707/523 |
| 5,495,577 | 2/1996 | Davis et al. | 707/542 |
| 5,500,931 | 3/1996 | Sonnenschein | 707/529 |
| 5,528,742 | 6/1996 | Moore et al. | 707/542 |
| 5,533,174 | 7/1996 | Flowers, Jr. et al. | 395/114 |
| 5,572,643 | 11/1996 | Judson | 395/200.48 |
| 5,583,978 | 12/1996 | Collins et al. | 345/170 |
| 5,606,649 | 2/1997 | Tai | 395/110 |
| 5,657,390 | 8/1997 | Elgamal et at. | 380/49 |
| 5,659,729 | 8/1997 | Neilsen | 395/603 |

FOREIGN PATENT DOCUMENTS 4-285198  4/1994  Japan.

OTHER PUBLICATIONS

Bilodeau, Anne. "Publishers Take Control." Web Week vol. 2, Issue 4, p. 3, Apr. 1996.

Frentzen, Jeff et al. "Delivering digital documents." Windows Sources vol. 3, No. 89, p. 118, Sep. 1995.

Sanders, Donald H. "Program Preparation Examples." Computers Today 3d ed. (New York: McGray–Hill) p. 640, 1988.

Staten, James. "Adobe to ink Web fonts." Mac Week, Feb. 28, 1996.

Ienaga, Yuriko. "Font." HTML Design Guide: Table Version 2.0 [document on–line]; available from http://www.ug.bc-c.bilkent.edu.tr/~cclub/html–docs/html13.0/text/font.html; Internet; accessed Oct. 7, 1997, Oct. 10, 1995.

"Font Face=fontName." Netscape Navigator For Windows Version 3.01, Oct. 31, 1996.

"Font Face=fontName." Netscape Navigator For Macintosh Beta Release 5.0, May 23, 1997.

*Primary Examiner*—Joseph H. Feild
*Assistant Examiner*—John L. Young
*Attorney, Agent, or Firm*—Klarquist Sparkman Campbell Leigh & Whinston

[57] ABSTRACT

A section of text in an electronic document is marked with a tag that designates a list of font faces for use in drawing the text at a computer which is remotely browsing the electronic document from a computer network. A browser at the computer chooses a font face for drawing the text from the font faces installed on the computer according to the tag-designated list, such as by matching font face name or set of font face characteristics. The browser also can include an alternative font table which stores data identifying alternative font faces for many common font faces. The browser searches the installed font faces for the alternative font faces to those in the tag-designated list when a direct match to the tag-designated font faces is not found.

20 Claims, 5 Drawing Sheets

FIG. 5   PRIOR ART

THIS TEXT IS IN BOLD.
*THIS TEXT IS IN ITALICS.*
THIS TEXT IS UNDERLINED.
~~THIS TEXT IS IN STRIKE-OUT.~~

LOCAL FONT FACE SELECTION FOR REMOTE ELECTRONIC DOCUMENT BROWSING

FIELD OF THE INVENTION

This invention relates generally to using locally installed font faces for browsing electronic documents from a remote computer network, and more particularly to controlling which local font face is used for an electronic document being browsed from the remote computer network to enhance the electronic document's appearance.

BACKGROUND AND SUMMARY OF THE INVENTION

Browsing software, generally known as "Internet browsers," are now in wide-spread use for retrieving (also known as "downloading") and viewing electronic documents in hyper-text markup language (HTML) format from a portion of the Internet known as the "world-wide web." Examples of currently available browsers include the Internet Explorer by Microsoft Corporation, the Navigator by Netscape Communications Corporation, Mosaic by the National Center for Supercomputing Applications, and others. These HTML documents are ASCII coded (a well known standard for coding alpha-numeric characters in 7- or 8-bits) character files generally consisting of text and HTML "tags" which specify formatting of the document, links (referred to as "hyper-links") to related documents, and other files that contain information (e.g., sound, images, video, etc.) which is to be combined into the document, among other tag features.

The Internet is a well known, global network of cooperatively interconnected computer networks. The world-wide web portion of the Internet is a collection of server computers (referred to as "sites") on the Internet which store HTML documents that can be publicly accessed by computer users having a connection to the Internet. There are many such world wide web sites on the Internet.

Individual computer users commonly connect to the Internet from their computer (sometimes referred to as a "client computer") over a conventional analog telephone line (sometimes referred to as a "POTS" line) with a modem. These users dial with the modem on the public telephone system to a server computer connected on the Internet, such as a server computer of an Internet access service provider with which the user has an account. Currently available modems typically are capable of communicating at speeds of approximately 14.4 kbit/second and 28.8 kbit/second. Some computer users access the Internet over faster telephone lines, such as ISDN, T1, or like telephone lines, and are able to obtain communications speeds that are four or more times faster than with modems and conventional analog "POTS" telephone lines.

In use, browser software allows a user to navigate (also known as "browsing") between documents and sites on the world-wide web. The user can enter a name of a document, referred to as a uniform resource locator ("URL"), which specifies a particular site and a particular resource or file at that site containing the document for the browser to retrieve. Alternatively, the user can activate a "hyper-link" on an HTML document currently being viewed to retrieve a related document (as specified by a URL in the hyper-link tag within the current HTML document). This causes the browser to jump or change its display to the new document specified by the hyper-link's URL.

When an HTML document is retrieved, the browser displays the document for the user to view. As is conventional in the computer field, the browser uses fonts to draw text of the document (i.e., generate and write display data to a display buffer or output device) for display on a monitor screen or other output device. A font is a collection of characters and symbols that share a common design. In HTML, the characters and symbols in the text of a document are specified by ASCII codes. The browser displays text by drawing the respective glyph of the characters and symbols from a font for the ASCII codes in the text of the HTML document.

In general, fonts have three major design elements referred to as typeface, style, and size. The typeface of a font (hereafter also referred to as the "font face") refers to specific characteristics of characters and symbols in the font such as the width of the thick and thin strokes that compose the character and the presence or absence of serifs. A serif is the short cross line at the ends of an unconnected stroke. A font or typeface without serifs is usually called a sans-serif font.

Style refers to the weight and slant of a font. Font weights can range from thin to black. In Microsoft Corporation's Windows operating system, fonts can have the following possible weights (from lightest to heaviest): thin, extra light, light, normal, medium, semi-bold, bold, extra bold, and heavy. The slant is characterized as roman, oblique, and italic.

Size generally refers to the height of the characters in a font. In the Windows operating system, the size of a font is an imprecise value. It can generally be determined by measuring the distance from the bottom of a lowercase "g" to the top of an adjacent uppercase "M." Font sizes in the Windows® operating system are specified in units called points (approximately 1/72 inch).

The font with which an HTML document is displayed can greatly affect the appearance of the document. However, with prior browsers, the ability of authors to control the fonts with which the document is displayed has been limited.

In the Windows operating system, font faces are designated by a font name. Some font faces (e.g., TRUETYPE® scalable outline font technology type of fonts) also are classified by numerical ratings in a set of attributes (e.g., the PANOSE® font face metric). The Windows operating system provides a number of application programming interface (API) functions which allow applications software to enumerate the font faces that are installed on a computer and query their attributes.

The HTML language defines a number of tags which allow an author of an electronic document to specify the appearance of text in the document. The version 2 standard of the HTML language (hereafter "HTML 2") includes tags for designating bold, italic, underlined, and strike-out style of the font for displaying text in an HTML document, such as the following:

<B>This text is in bold.</B>

<I>This text is in italics.</I>

<U>This text is underlined.</U>

<S>This text is in strike-out.</S>

In addition, the following tags in HTML 2 denote text that is to be displayed in fixed-pitch typeface: <PLAINTEXT> . . . </PLAINTEXT>, <PRE> . . . </PRE>, <TT> . . . </TT>, and <XMP> . . . </XMP>.

Browsers which support HTML 2 recognize these tags and display the text of electronic documents which include these tags accordingly. For example, the pieces of text in the above bold, italic, underlined and strike-out examples would be displayed by the browser in an electronic document as shown in FIG. 5. Prior browsers typically display text which is marked with the above fixed-pitch typeface tags (e.g., <PLAINTEXT>) using a font with a fixed-pitch typeface, and otherwise use a font with a proportional typeface.

Some prior browsers also support some extensions of the standard HTML language. The HTML language can be extended by defining new tags and/or tag attributes. So that extensions can be added without causing prior browsers to fail, browsers generally ignore HTML tags that they do not support.

One prior browser, the Navigator by Netscape Communications Corporation of Mountain View, Calif., supports an HTML extension which allows an author of an HTML document to specify a base font size and a relative font size for different parts of the text in a document. These HTML extensions include the following tags:

<BASEFONT SIZE=n>

<FONT SIZE=n, +n or −n>

These tags specify a number n between 1 and 7 for the font size, where 7 is the largest font size. A plus before the number indicates the font size relative to the current base font size setting. For example, where the base font size is set to 3 with the tag <BASEFONT SIZE=3>, the tag <FONT SIZE=+2> specifies a font size of 5.

Accordingly, while authors of HTML documents on the world-wide web have been able to control the style and size of the fonts used to draw their documents, the ability to control the particular font faces for the text of HTML documents retrieved from the Internet has been limited. There have been a number of tags for designating font styles and size (e.g., the <B>, <U>, <I>, <S>, <BASEFONT SIZE=n>, and <FONT SIZE=±n> tags described above). However, the HTML tags for designating typeface of a font have been limited to those designating text as having a fixed-pitch font.

For this reason, prior browsers generally have used only two font faces for displaying HTML documents, a fixed-pitch typeface and a proportional type face. In some prior browsers, these two font faces are set by default. In others, these two font faces are an option that can be set by the user. In either case, the same two font faces are used for displaying all HTML documents.

Since the appearance of a document can be greatly affected by the font faces used, it is often desirable for authors of HTML documents on the world wide web to be able to control the particular font face used when browsing the document at a client computer. It also is desirable for some documents to be able to use several different font faces, or to use other than a standard fixed-pitch or proportional font face (e.g., a script, modern or Gothic family font face).

A problem also exists that the font faces that are installed at different client computers vary widely. Different computer platforms typically have different font faces. For example, a standard installation of the Windows operating system on a computer with an Intel or compatible microprocessor has different font faces than a Macintosh computer from Apple Computer, Inc., or a computer with a version of the UNIX operating system, or a computer with the OS/2 Warp operating system from IBM. However, each of these computer platforms are employed in browsing HTML documents from the world wide web. Also, the same font face often is referred to differently on different platforms (i.e., has a different name). This is referred to herein as the multiple platforms problem. Further, there is a very large number of font faces that are sold by other parties as add-ons to these platforms, or bundled with applications software for these platforms. So, the font faces often are quite different even between two client computers having the same platform.

Another problem exists in that there are sometimes different versions of the same font face, especially for computers that are sold or used internationally. In such computers, there can be several font faces of the same name for different international character and symbol sets (e.g., the "Arial" font face may have both western and Cyrillic alphabet versions) which are installed on the same computer. This is referred to herein as the multiple installed fonts problem.

In accordance with the present invention, a tag in an electronic document controls the font face for text in the document by designating a list of one or more font faces. In the illustrated embodiment of the invention, the tag is an HTML tag which includes a comma delimited list of font face names or font face characteristic sets. When remotely browsing the electronic document, a browser at a client computer finds a font face in the list that is installed at the client computer and displays the text with that font face.

For solving the multiple platform problem with the invention, the tag can designate a list of equivalent font faces for each of a plurality of platforms which are intended to browse the electronic document. The browser at a computer having any of the platforms can then choose an installed font face appropriate to the computer's platform in the list to use for drawing the text of the document. Thus, an author of an electronic document can control the font face of text in the document to have a same or similar appearance across multiple platforms.

For solving the multiple installed fonts problem, the browser again finds a font face in the list that is installed at the client computer. If there are more than one font face with that same name, the browser selects the font face with the same default character set which is set in the operating system. For example, if the western character set is set as the default for the operating system, the browser also selects the font face with the western character set.

In accordance with one aspect of the invention, the font faces are listed in the tag in an order of preference. The browser traverses the list in order and selects the first of the font faces in the list that is installed at the client computer. The browser thus selects the most preferred font face for the document's text that is installed at the client computer.

In accordance with another aspect of the invention, the browser includes a table of alternative font faces. The table lists alternative font faces for a plurality of common font faces (e.g., alternatives for the common font face on each of various computer platforms). When an exact match to a font face in the tag's list is not installed at the client computer, the browser consults the alternative font face table. If the table lists an alternative font face for a font face in the tag's list that is installed at the client computer, the browser selects that alternative font face for drawing the document's text. With this aspect of the invention, the author of the electronic document need not be aware of the alternatives of a particular font face on different computer platforms or list these alternatives with the font face tag. The author need only list a preferred font face, and the browser will determine the appropriate alternative font face for the particular client computer from the alternative font faces table. Thus, the multiple platform problem also is solved through the mechanism of the alternative fonts table.

Additional features and advantages of the invention will be made apparent from the following detailed description of an illustrated embodiment which proceeds with reference to the accompanying drawings.

BRIEF DESCRIPTION OF THE DRAWINGS

FIG. 5 is a view of example text displayed by a prior art browser for standard HTML tags controlling font style.

DETAILED DESCRIPTION OF THE ILLUSTRATED EMBODIMENTS

Figure 1:
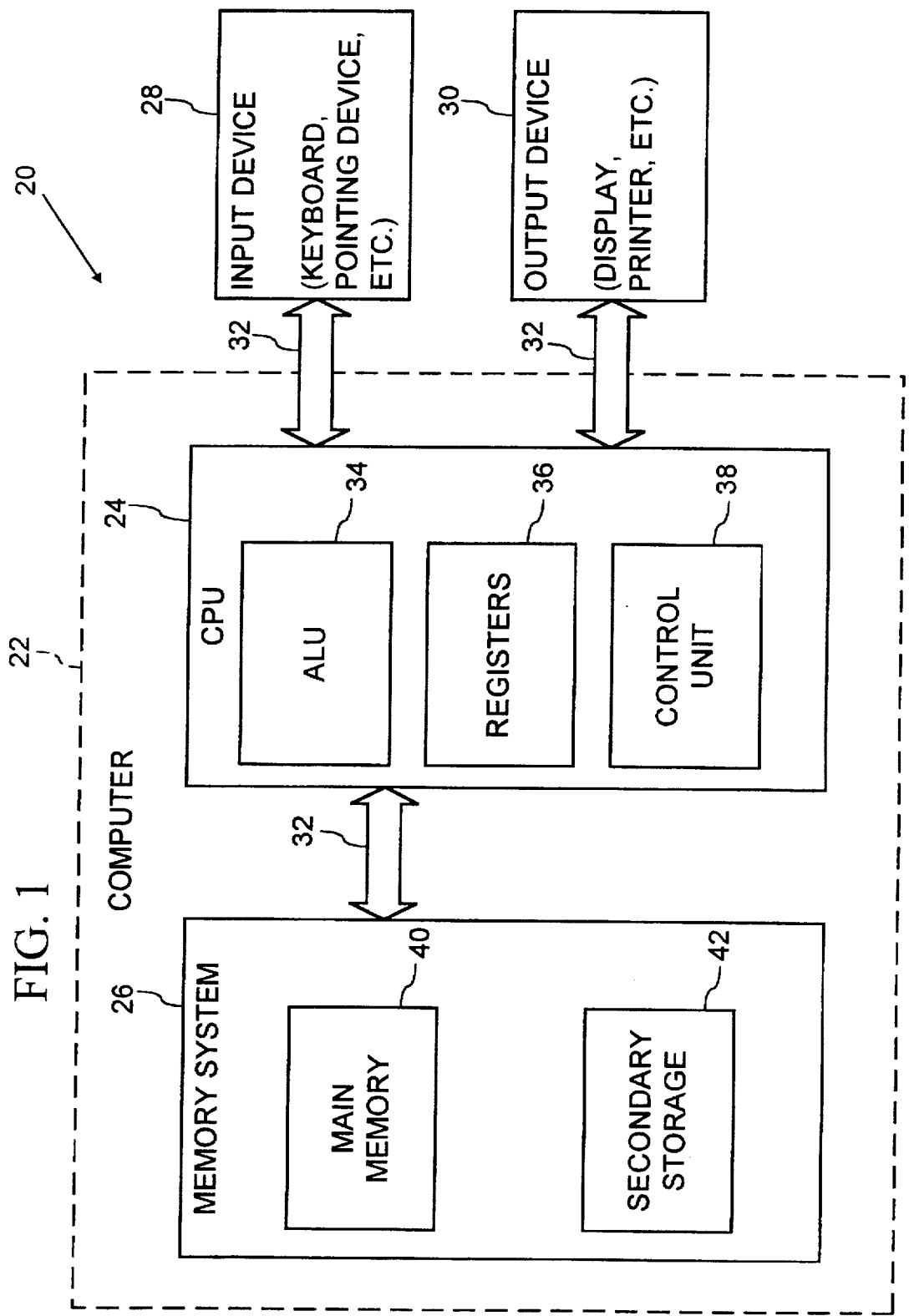
FIG. 1 is a block diagram of a computer system that may be used to implement a method and apparatus embodying the invention for enhancing the appearance of remotely browsed electronic documents.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of media such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. Preferably, the operating system employs a graphical user interface where the display output of an application program is presented in a rectangular area (sometimes referred to as a "Window") on the screen of the output device 30 and is also multi-tasking (allowing application programs to execute computing tasks in multiple threads), such as Microsoft's Corporation's Windows 95 or Windows NT operating system, IBM's OS/2 Warp operating system, Apple's Macintosh System 7 operating system, X-Windows, etc.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Browser Overview

Figure 2:
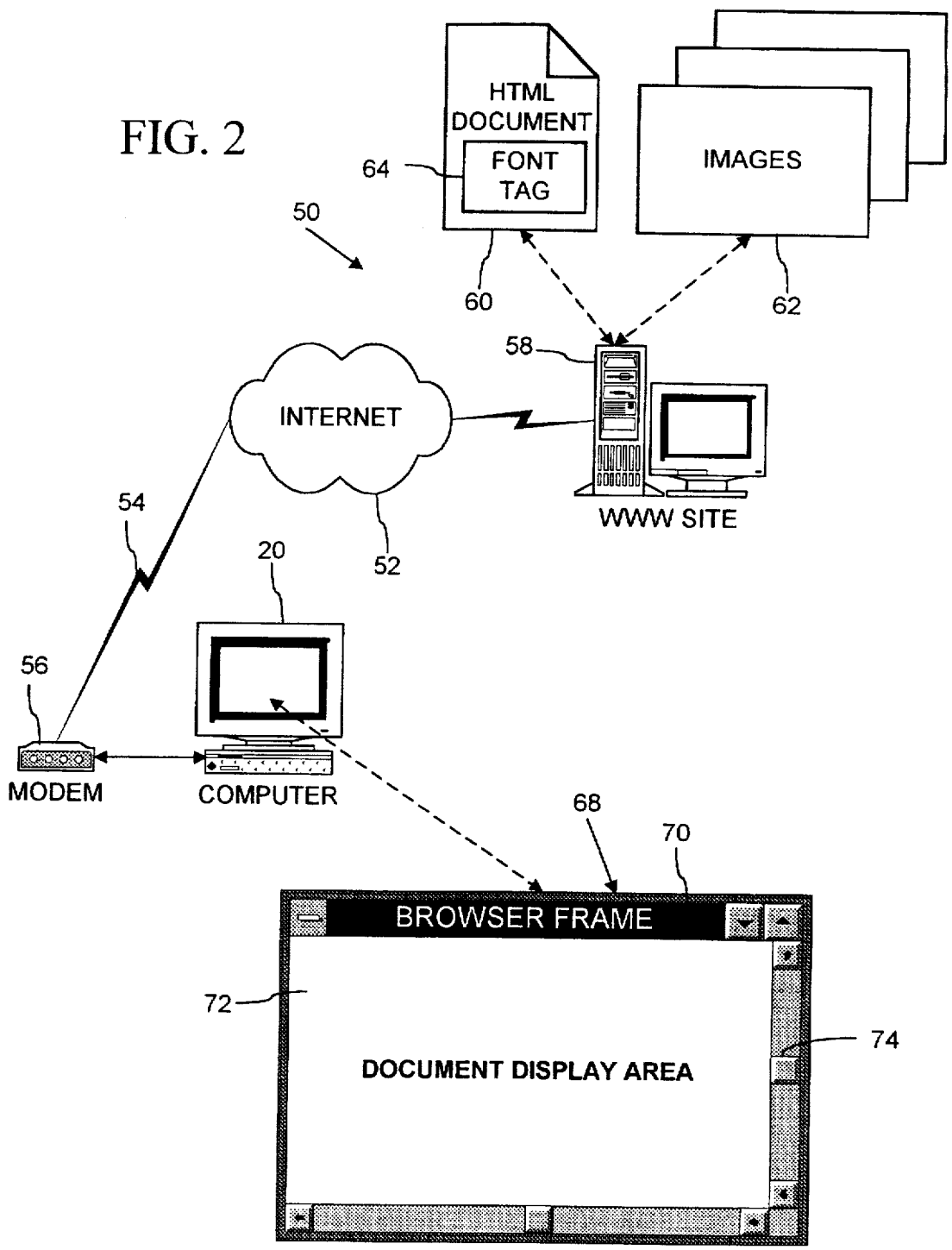
FIG. 2 is a block diagram of the computer system of FIG. 1 connected to a remote computer network (e.g., the Internet) for locally browsing electronic documents residing at a remote computer site.

In a browsing environment 50 of an illustrated embodiment of the invention shown in FIG. 2, the computer 20 (also shown in FIG. 1) runs a browser application software (hereafter "browser") 82 (FIG. 3) for browsing electronic documents from a remote computer network 52. The illustrated remote computer network 52 is the Internet, which is described in the Background and Summary of the Invention above. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN) or like computer network.

An electronic document 60 for browsing with the computer 20 resides at a remote computer 58 (also referred to as a world-wide web site) connected to the computer network 52. The illustrated electronic document 60 conforms with HTML standards, and may include extensions and enhancements of HTML standards. In conformance with HTML, the electronic document 60 can incorporate other additional information content 62, such as images, audio, video, executable programs, etc. (hereafter simply "images" 62), which also reside at the remote computer 58. The electronic document 60 and images 62 preferably are stored as files in a file system of the remote computer 58. The electronic document 60 incorporates the images 62 using HTML tags that specify the location of files containing the images on the Internet 52. In alternative embodiments of the invention, the electronic document 60 can have other structured document formats.

In accordance with the invention, the electronic document 60 can include a font face tag 64 for designating a font face of some text in the document. In the illustrated embodiment of the invention, the font face tag 64 specifies a comma delimited list of one or more font face names, such as the following:

<FONT FACE="name[,name2][,name3] ... ">

In some embodiments of the invention, the font face tag 64 can additionally or alternatively designate font faces using a set of characteristics or attributes, rather than by name. This set of characteristics can include the width of thick and thin strokes that compose the characters, the presence or absence of serifs, the variable or fixed pitch of characters, etc. One such set of characteristics for designating font faces is the PANOSE® font face metric used in TRUETYPE® scalable outline font technology type of font files. The PANOSE® font face metric classifies font faces by assigning numeric ratings of each font face in ten different attributes.

The browser on the computer 20 retrieves electronic documents from their sites on the Internet (e.g., the electronic document 60 from the site 58) in response to user input and displays the document on the computer's screen or output device 30 (FIG. 1). The user specifies a URL of a particular document, such as by inputting a URL character string with a keyboard, by clicking a hyperlink specifying the URL in a document currently being displayed, or by selecting a URL from a list. In response to the input, the browser transmits requests on the Internet for the document 60 and its images 62 using conventional Internet communications protocols, such as the hyper-text transport protocol (HTTP), the Transmission Control Protocol (TCP) and the Internet Protocol (IP). In general, protocols are a set of rules and a prearranged data format defining how two computers communicate on the computer network 52.

The browser has a window 68 on the screen of the computer's output device 30 (FIG. 1) as is conventional for application programs in an operating system with a graphical user interface. The browser includes a frame 70 or border with graphical user interface controls (e.g., a menu bar, scroll bars, buttons, etc.) which surrounds a document display area 72 in the window 68. The user interface controls of the frame 70 can be activated by the user with the input device 28 (FIG. 1) to control the browser. The browser displays the electronic document 60 that the user is currently browsing in the document display area 72. If the electronic document is too large to completely fit within the document display area 72, the browser displays a portion of the document (referred to hereafter as the "visible portion") in the document display area 72 and presents a scroll bar 74 in the browser frame 70. The user can manipulate the scroll bar 74 with a mouse or other pointing device or input key commands on the keyboard to change the visible portion of the document that is shown by the browser within the document display area 72.

Figure 3:
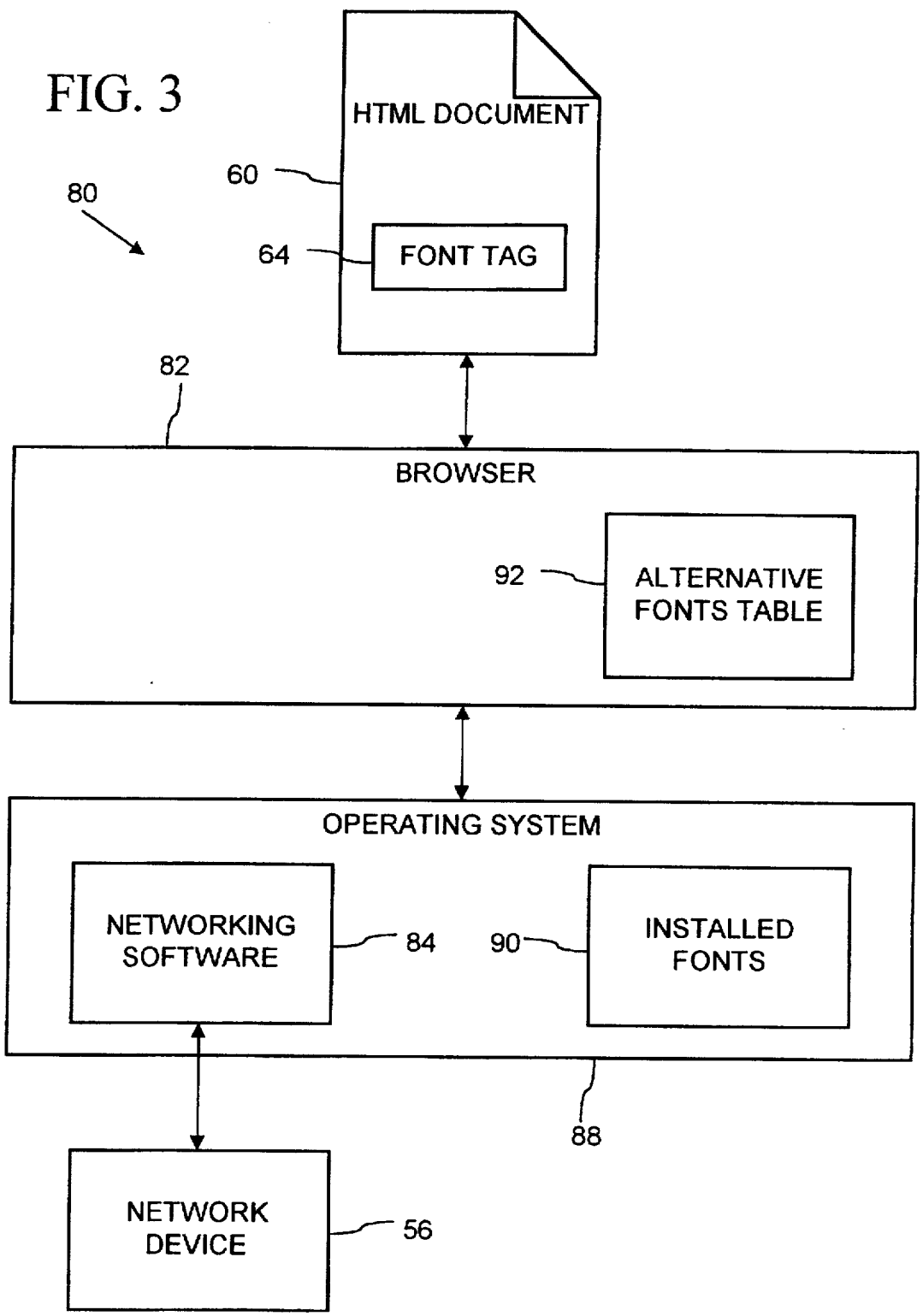
FIG. 3 is a block diagram of a browser in the system of FIG. 2 for remotely browsing an electronic document from a computer network, including selecting a font face for the document's text according to the illustrated embodiment of the invention.

Referring now to FIG. 3, a software operating environment 80 within the browsing environment 50 (FIG. 2) includes the browser 82, an operating system 88, and a network device 56 (e.g., the modem of FIG. 2, a network adapter card or the like). The operating system 88 includes networking software 84 which implement networking protocols for communicating on the Internet and for controlling the network device 56. For example, the operating system 88 in the illustrated embodiment is Microsoft Corporation's Windows 95 operating system which includes a Remote Network Access subsystem, a Windows sockets, a TCP/IP network protocol driver, and a network adapter driver as the networking software 84 for communicating on the Internet. The browser 82 utilizes the networking software 84 of the operating system 88 and the network device 56 to retrieve the electronic document 60 from the Internet. The browser 82 communicates with the operating system 88 using a set of application programming interfaces (APIs) of operating system functions and services.

The operating system 88 also includes a number of font faces 90 which are installed at the computer 20 for use in drawing text for output to the user at the output device 30 (e.g., monitor screen, printer, etc.). In the Windows 95 operating system, the font faces 90 can be installed from an application program which calls an AddFontResource or AddFontModule API of the operating system (and removed with the RemoveFontResource or RemoveFontModule APIs). The browser 82 can determine which font faces 90 have been installed by calling the EnumFontFamilies API (or EnumFonts API), and select one of the installed font faces 90 by calling the CreateFont API in the Windows 95 operating system. In embodiments of the invention using another operating system, the browser 82 can enumerate and select font faces with like functions provided in such other operating system.

The illustrated browser 82 includes an alternative font faces table 92. The alternative font faces table 92 is a data structure which lists alternative font faces on various computer platforms (e.g., Windows, OS/2, Apple Macintosh, etc.) for a plurality of common font faces. The alternative font faces listed in the table for one of the common font faces are the closest equivalent of that common font face on the various computer platforms. The browser 82 thus can find the equivalent font faces on various computer platforms by looking up a given font face in the table 92.

Font Face Selection Process

Figure 4:
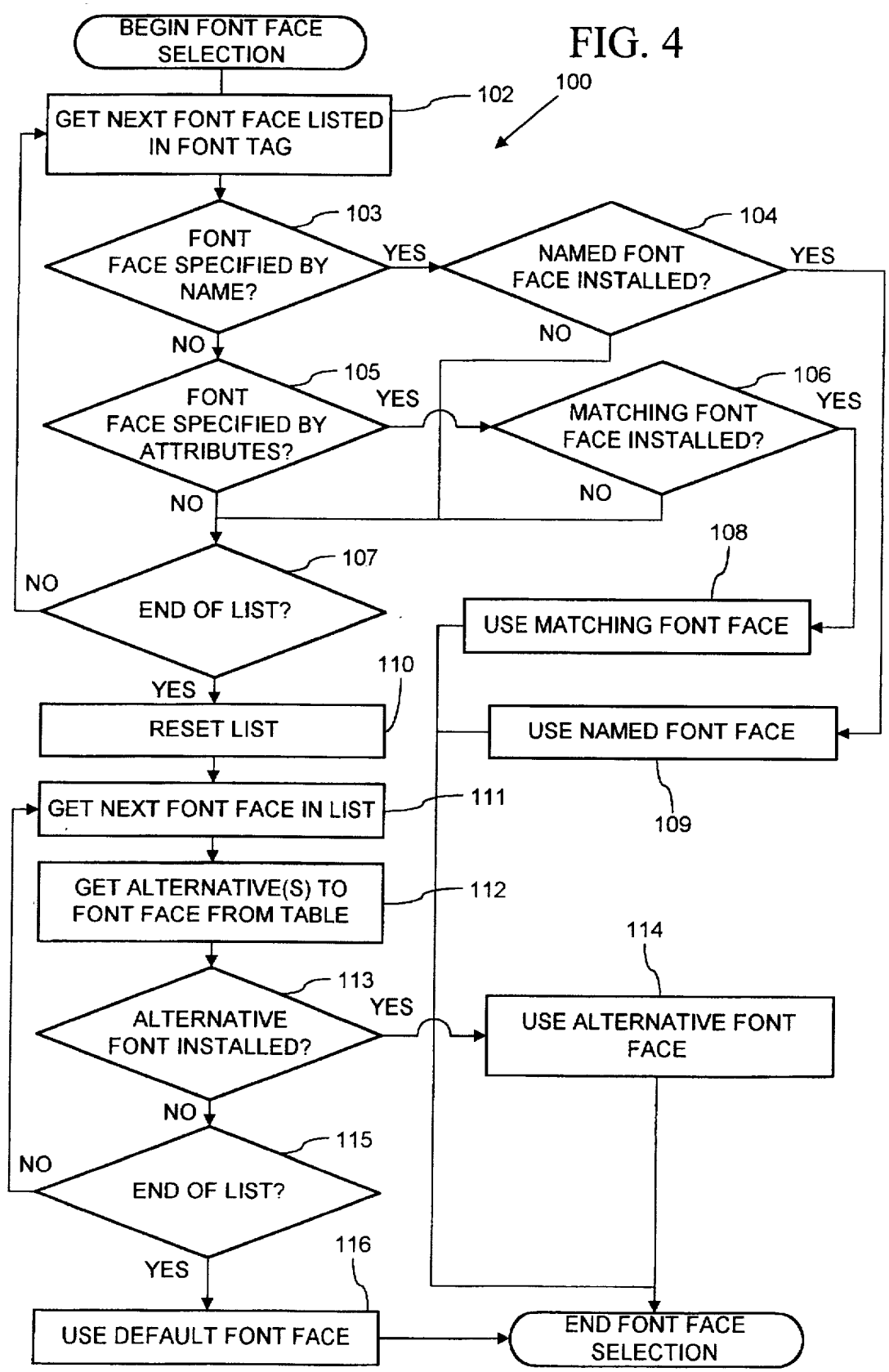
FIG. 4 is a flow chart depicting a process used by the browser of FIG. 3 for selecting a font face to use for the text of the electronic document to enhance the document's appearance.

With reference now to FIG. 4, the browser 82 (FIG. 3) in the illustrated browsing environment 50 (FIG. 2) utilizes a font face selection process 100 to choose a font face 90 (FIG. 3) installed on the computer 20 (FIG. 1) when drawing text of the document 60 in the document display area 72 (FIG. 2). The browser 82 performs the font face selection process 100 when some of the text (hereafter the "marked text") of the document is marked with the font face tag 64 (FIGS. 2 and 3) described above. When browsing the document 60, the browser 82 parses the document to identify the tags contained therein and draw the document accordingly. When a font face tag 64 is encountered in the document, the browser 82 performs the font face selection process 100 to choose an installed font of the computer 20 to use in drawing the marked text.

In the process 100, the browser 82 searches for an installed font face 90 which matches one listed in the tag 64 to use in drawing the marked text. If there is no matching installed font face 90, the browser 82 searches for an installed font face 90 that is an alternative or equivalent in the table 92 of one listed in the tag 64 to use in drawing the marked text. Otherwise, the browser 82 uses a default font face for drawing the marked text.

In a first loop of steps 102–107, the browser 82 traverses the list of font faces specified in tag 64 from first to last, searching for a matching installed font face 90. The browser 82 performs a separate iteration of the loop for each of the listed font faces. At the first step 102, the browser 82 reads a next font face (hereafter the "current font face" of the "current loop iteration") listed in the font face tag 64 in order. In an embodiment of the invention where the tag 64 lists the font face by name, the browser 82 then searches for an installed font face 90 with a matching name as indicated at the steps 103–104. In the illustrated operating environment 80 (FIG. 3), the browser 82 calls an API of the operating system 88 for enumerating the installed font faces (e.g., the EnumFontFamilies or EnumFonts APIs of the Windows 95 operating system). The browser 82 then compares the name of the current font face to the enumerated font face names. The browser 82 finds a match if an enumerated font face has the same name as the current font face. If there are multiple font faces with the same name, such as where multiple of the same font face are installed with different character sets (e.g., western, Cyrillic, etc.), the browser 82 selects the installed font face with the default character set of the operating system as the matching font face.

In embodiments of the invention where the tag 64 specifies font faces by a set of characteristics or attributes, the browser 82 then searches for an installed font face 92 whose characteristics match those of the current font face as shown at the steps 105–106. In the operating environment 80, the browser 82 calls an API of the operating system to obtain the characteristics of each font face. For example, in the Windows 95 operating system, the browser can call the GetOutlineTextMetrics API to obtain a data structure which contains the characteristics of an installed font, including PANOSE® font face metric numbers for those installed font faces 90 that are TRUETYPE® scalable outline font technology type of fonts. The browser then compares the characteristics of the current font face to those of each installed font face. Preferably, the browser finds a match if the current font face's characteristics are within a predetermined numerical tolerance of the characteristics of an installed font face. If there is more than one installed font face which is within the tolerance, the browser 82 selects the installed font face with the closest matching characteristics as the matching font face.

If there is a tie, such as where multiple of the same font face for different international character sets are installed, the browser 82 selects the installed font face having the default character set of the operating system 88 (FIG. 2). For example, if the western character set is the operating system's default character set, then the browser selects the font face with that same character set as the matching font face.

If a matching font face is found at the steps 104 or 106, the browser selects and uses the matching font face in drawing the marked text of the document as indicated at steps 109–110. In the illustrated operating environment 80, the browser 82 can draw the marked text with the chosen font by calling APIs of the operating system. For example, in the Windows 95 operating system, the browser can call the DrawText, TabbedTextOut, or ExtTextOut APIs to draw the marked text in the document display area 72 with the chosen installed font.

Otherwise, if no matching installed font face for the current font face is found, the process 100 continues to the step 107 where the browser 82 repeats the loop 102–107 until the list of font faces in the tag 64 is completed.

If the tag's list is exhausted at step 107 and no matching font face is found, the process 100 proceeds to a second loop of steps 111–115 where the browser searches the installed font faces 90 for alternatives or equivalents according to the alternative fonts table 92 of the font faces listed in the tag 64. At the step 110, the browser 82 first resets the tag's list so as to again iterate through the listed font faces in order. At the step 111, the browser 82 reads a next font face in the tag's list which again is the "current font face" for the "current iteration" of the loop 111–115.

At the step 112, the browser 82 performs a look-up of alternative font faces for the current font face from the alternative font faces table 92. The browser 82 then checks whether any of the alternative font faces identified for the current font face by the table are among the installed font faces 90. If so, the browser 82 selects and uses that installed font face for drawing the marked text of the document in the document display area 72 at the step 114. Again, if there are multiple of the same font face with different character sets that match the alternative font face, the browser 82 selects the matching font face with the default character set of the operating system.

Otherwise, if the table 92 does not list alternatives for the current font face or none of the alternative font faces for the current font face are installed, the process 100 continues to the step 115 where the browser repeats the loop 111–116 until searching for alternatives of all font faces in the tag's list is completed. If the browser completes both loops 102–107 and 111–115 for each font face listed by the tag without finding a matching or alternative installed font face 90, the browser chooses a default installed font face to use for drawing the marked text at the step 116.

After an installed font face is chosen for drawing the marked text at the steps 108, 109, 114 or 116, the process 100 ends.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of remotely browsing electronic documents from a computer network at a computer having a plurality of installed font faces, comprising:

retrieving a selected document from a remote site on the computer network;

detecting a font face tag in the selected document, the font face tag marking a section of text in the selected document and designating a list of font faces for said marked text;

choosing a font face out of the installed font faces according to the designated list of font faces; and drawing the marked text of the selected document with the chosen font face.

wherein the tag designates font faces in the list by a set of font face characteristics.

2. A computer-readable medium having computer-executable instructions for performing the steps recited in claim 1.

3. The method of claim 1 wherein the characteristics are rated numerically.

4. The method of claim 3 wherein the font face tag designates font faces in the list by a set of numbers according to a font face metric.

5. A computer-readable medium having computer-executable instructions for performing the steps recited in claim 4.

6. The method of claim 3 wherein the font face tag designates font faces in the list by values indicative of stroke width, the variable or fixed pitch of characters, and the presence or absence of serifs.

7. The method of claim 1 comprising:
choosing one of the installed font faces having a set of characteristics matching a set of characteristics designated in the list as the font face for drawing the marked text of the selected document.

8. The method of claim 7 comprising:
determining that a set of characteristics of an installed font face matches a set of characteristics designated in the list if the characteristics are within a predetermined tolerance.

9. A computer-readable medium having computer-executable instructions for performing the steps recited in claim 8.

10. The method of claim 7 wherein the font face tag designates font faces in the list by a set of numbers according to a font face metric, and the installed font faces have a set of numbers according to a font face metric, the method further comprising:
determining that a set of characteristics of an installed font face matches a set of characteristics designated in the list if the sets of numbers of the designated font face and the installed font face are within a predetermined tolerance.

11. A computer-readable medium having computer-executable instructions for performing the steps recited in claim 10.

12. The method of claim 7 wherein the font face tag designates font faces in the list by values indicative of stroke width, the variable or fixed pitch of characters, and the presence or absence of serifs, and the installed font faces have values indicative of stroke width, the variable or fixed pitch of characters, and the presence or absence of serifs, the method further comprising:
determining that a set of characteristics of an installed font face matches a set of characteristics designated in the list if the values of the installed font face and the designated font face are within a predetermined tolerance.

13. A method of remotely browsing electronic documents from a computer network at a computer having a plurality of installed font faces, comprising:
retrieving a selected document from a remote site on the computer network;
detecting a font face tag in the selected document, the font face tag marking a section of text in the selected document and designating a list of font faces for said marked text;
choosing a font face out of the installed font faces according to the designated list of font faces; and
drawing the marked text of the selected document with the chosen font face,
where multiple of the installed font faces having different character sets match a font face designated in the list, the choosing step comprises choosing one of the multiple installed font faces having a default character set as the font face for drawing the marked text of the selected document.

14. A computer-readable medium having computer-executable instructions for performing the steps recited in claim 13.

15. A method of remotely browsing electronic documents from a computer network at a computer having a plurality of installed font faces, comprising:
retrieving a selected document from a remote site on the computer network;
detecting a font face tag in the selected document, the font face tag marking a section of text in the selected document and designating a list of font faces for said marked text;
maintaining a table of alternative font faces to each of a plurality of font faces;
looking up alternative font faces to one of the font faces designated in the list;
choosing one of the installed font faces matching one of the alternative font faces to said one font face designated in the list as the font face for drawing the marked text of the selected document; and
drawing the marked text of the selected document with the chosen font face.

16. A computer-readable medium having computer-executable instructions for performing the steps recited in claim 15.

17. A method of remotely browsing electronic documents from a computer network at a computer having a plurality of installed font faces, comprising:
retrieving a selected document from a remote site on the computer network;
detecting a font face tag in the selected document, the font face tag marking a section of text in the selected document and designating a list of font faces for said marked text;
for each of the font faces designated in the list in order of appearance, searching the installed font faces to find a font face matching said designated font face;
if a matching font face is found for any of the font faces designated in the list, choosing the matching font face for drawing the marked text of the selected document;
if no matching font face is found, then for each of the font faces designated in the list in order of appearance:
looking up alternative font faces of said designated font face in a table;
for each of the alternative font faces, searching the installed font faces to find a font face matching said alternative font face; and
if a matching font face is found for any of the alternative font faces of said designated font face, choosing the matching font face for drawing the marked text of the selected document; and
drawing the marked text of the selected document with the chosen font face.

18. A browser for remotely browsing electronic documents from a computer network at a computer having a plurality of installed fonts, comprising:
networking code for retrieving a selected document from a site on the computer network responsive to user input, the selected document having a font face tag marking a section of text in the selected document and designating a list of font faces for said marked text, wherein the tag designates the list of font faces by a set of font face characteristics;
parsing code for separating and identifying the font face tag and the marked text;
font face selection code for choosing one of the installed fonts according to the designated list of font faces;
text drawing code for drawing the marked text of the selected document with the chosen font face;

searching code for finding one of the installed font faces having a set of font face characteristics matching any of the font faces designated in the list; and the font face selection code choosing said one of the installed font faces.

19. A browser for remotely browsing electronic documents from a computer network at a computer having a plurality of installed fonts, comprising:

networking code for retrieving a selected document from a site on the computer network responsive to user input, the selected document having a font face tag marking a section of text in the selected document and designating a list of font faces for said marked text;

parsing code for separating and identifying the font face tag and the marked text;

font face selection code for choosing one of the installed fonts according to the designated list of font faces;

text drawing code for drawing the marked text of the selected document with the chosen font face;

a table for storing data associating each of a plurality of font faces with one or more alternative font faces to said each font face;

table look-up code for looking up in the table any alternative font faces to the font faces designated in the list; and searching code for searching the installed font faces for one of the installed font faces that matches any alternative font faces to the font faces designated in the list, wherein the font face selection code chooses said one of the installed font faces.

20. An electronic document residing at a site on a computer network for remotely browsing from a computer having font faces installed thereon, comprising:

a section of text;

a font face tag marking the section of text and designating a list of font faces for controlling the font face installed at the computer which is used to draw the marked section of text at the computer; and a plurality of sets of font face characteristics in the list for designating font faces.

* * * * *